(12) United States Patent
Skaggs et al.

(10) Patent No.: US 7,825,066 B1
(45) Date of Patent: Nov. 2, 2010

(54) RAPID FORMALDEHYDE NEUTRALIZATION USING CHEMICALLY TREATED DRY MATERIALS

(76) Inventors: Donald E. Skaggs, 861 Burkewood Dr., Lexington, KY (US) 40509; Donald R. Skaggs, P.O. Box 11, Webbville, KY (US) 41180

( * ) Notice: Subject to any disclaimer, the term of this patent is extended or adjusted under 35 U.S.C. 154(b) by 71 days.

(21) Appl. No.: 12/313,549

(22) Filed: Nov. 21, 2008

Related U.S. Application Data

(60) Provisional application No. 61/003,946, filed on Nov. 21, 2007.

(51) Int. Cl.
*B01J 20/00* (2006.01)
(52) U.S. Cl. ........................................ 502/400; 502/408
(58) Field of Classification Search ................. 502/400, 502/408
See application file for complete search history.

(56) References Cited

U.S. PATENT DOCUMENTS 3,979,341 A * 9/1976 Widmann .................... 521/106
6,043,405 A * 3/2000 Honeycutt et al. .......... 588/318

* cited by examiner

*Primary Examiner*—Timothy C Vanoy
*Assistant Examiner*—Michelle Hou
(74) *Attorney, Agent, or Firm*—James Francis

(57) ABSTRACT

A formula and method for rapid neutralization of formaldehyde solutions and vapor is provided. The invention comprises a matrix or medium upon which a mixture of urea, acid, calcium chloride and water is applied and dried. When the treated matrix or medium comes into contact with formaldehyde solution or vapor, the hydroscopic nature of the calcium chloride dried on the medium quickly absorbs and neutralizes the formaldehyde, irreversibly changing the formaldehyde molecules to a nonhazardous and nontoxic polymer. This reduces the risk of exposure to formaldehyde solution and vapor by the technician handling the material.

5 Claims, 1 Drawing Sheet

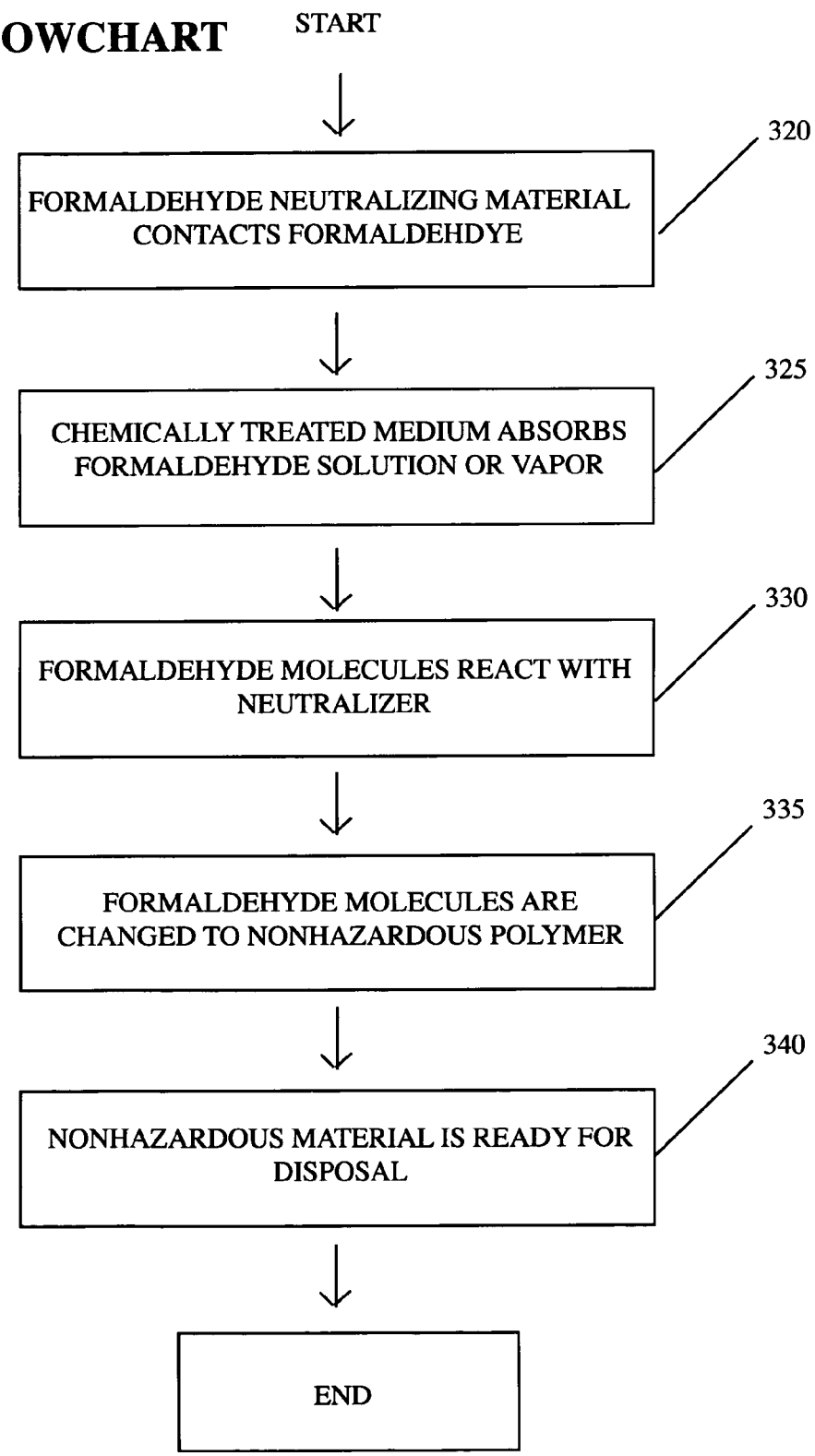
FIG 1: FLOWCHART

RAPID FORMALDEHYDE NEUTRALIZATION USING CHEMICALLY TREATED DRY MATERIALS

CROSS REFERENCE TO RELATED APPLICATIONS

This application claims the benefit of PPA Ser. No. 61/003,946, filed 2007 Nov. 21 by the present inventors.

Other References:
1. U.S. Pat. No. 3,689,463 (1972) to Krugilkov, et al.
2. U.S. Pat. No. 4,757,108 (1988) to Walisser
3. U.S. Pat. No. 4,901,410 (1990) to Fischer, et al.
4. U.S. Pat. No. 5,108,621 (1992) to Robins
5. U.S. Pat. No. 5,317,071 (1994) to Honeycutt
6. U.S. Pat. No. 5,352,368 (1994) to Honeycutt
7. U.S. Pat. No. 5,554,718 (1996) to Flory, et al.
8. U.S. Pat. No. 5,674,971 (1997) to Graves
9. U.S. Pat. No. 6,043,405 (2000) to Honeycutt, et al.

FEDERALLY SPONSORED RESEARCH

Not Applicable

SEQUENCE LISTING OR PROGRAM

Not Applicable

BACKGROUND OF THE INVENTION

1. Field of Invention

This invention relates to the neutralization of hazardous formaldehyde solutions to reduce the risk of direct and airborne contact by the use of chemically treated dried materials.

2. Background of the Invention

Formaldehyde solutions have been used as a tissue fixative and transport solution for biological study for over a century. Only in the last several decades have we learned the potential hazards of formaldehyde to the technicians exposed to this material.

Commonly used in the health care industry to preserve biological samples for pathological analysis, formaldehyde solutions remain the common fixative of choice. In a routine health care environment, histologists receive multiple biological tissue samples in these formaldehyde solutions from a variety of sources throughout an average workday. Once received into the pathology laboratory, the biological samples that are contained in the formaldehyde solution are transferred to an open grossing board for analysis by a pathologist. Once studied on the grossing board, part or all of each sample is inserted into a tissue cassette. At this point, the biological sample is then inserted into a tissue processor, a machine that further subjects the sample to more formaldehyde solutions that are handled by the laboratory technician. In all of these procedures described above, the risk of both vapor and direct contact exposure for formaldehyde remains high for the laboratory technician.

While some measures have been taken to reduce the amount of formaldehyde vapor the pathologist and technician are notably exposed to such as fume hoods and monitors for exposure levels, attempts at absorbing and neutralizing formaldehyde solutions at the point of contact have been problematic. Current products on the market that attempt this goal either hold the formaldehyde solution in an absorbent material or chemically treat a fiber material with a wet chemical mixture, leaving the fiber material in a constant damp state. Holding the formaldehyde solution in an absorbent material has the problem of simply wicking the formaldehyde while continuing to broadcast the formaldehyde vapor into the technician's breathing area. Treating a fiber material with a wet chemical mixture has the additional problem of not absorbing other liquids or formaldehyde vapors present in the air.

These disadvantages, along with the increasing awareness of reducing formaldehyde vapor and contact exposure to the laboratory technician, increases the need for an improved method or technology for reducing this risk.

Formaldehyde polymerization by use of urea is a proven method of neutralizing formaldehyde. The reaction of formaldehyde with urea and acid will neutralize the formaldehyde. However, in practical use this reaction is slow, typically taking hours to completely neutralize the formaldehyde solution, including it's vapor-generating capabilities. Furthermore, the use of such a limited combination of materials would not be viable for an application such as responding to a formaldehyde spill or controlling formaldehyde vapor.

Accordingly, there is a need for a device and method to quickly neutralize formaldehyde not only for waste disposal, but to provide the practical applications of controlling a formaldehyde spill and restricting formaldehyde vapor. Current formaldehyde spill and vapor control methods suffer from a number of disadvantages:
  a. Formaldehyde neutralization methods are not rapid or do not pass the American Society for Testing and Materials (ASTM) method test for presence of formaldehyde.
  b. Many formaldehyde spill response and control products simply absorb or wick the formaldehyde, not providing neutralization, resulting in broadcasting the formaldehyde vapor back into the air.
  c. Some formaldehyde spill response and control products are treated with wet chemicals and do not rapidly absorb formaldehyde vapor from the air.

OBJECTS AND ADVANTAGES

In addition to the overall effectiveness of formaldehyde neutralization by the reaction of urea and phosphoric acid, the addition of calcium chloride provides a rapid reaction to neutralizing the formaldehyde not found with other materials. This not only creates a rapid reaction of formaldehyde neutralization for waste disposal, but also provides a practical application with regard to the rapid response to an accidental spill, or in the case of controlling vapor, the use of these components in a dried, vapor absorbing material.

Accordingly, besides the objects and advantages of the rapid neutralization of formaldehyde using treated, dried materials described in the provisional patent, several object and advantages of the present invention are:
  a) To provide a method of rapidly neutralizing formaldehyde solutions and vapor which can be used in the application of direct contact with formaldehyde solutions.
  b) To provide a method of rapidly neutralizing formaldehyde solutions where the application of the formaldehyde neutralizing solution to a matrix or medium that is dried for the use of absorbing vapors and neutralizing formaldehyde vapors from the ambient air.
  c) To provide a method of rapidly neutralizing formaldehyde solutions and vapor where the formaldehyde neutralizing mixture can be applied to a matrix or medium and dried for the application of passing air over or through to absorb and neutralize formaldehyde vapors within said air.
  d) To provide a method of rapidly neutralizing formaldehyde solutions where calcium chloride is used to enhance the hydroscopic nature of the solution that is applied to a matrix or medium and then dried, adding to the vapor absorbing ability of the final absorbent material.

e) To provide a method of rapidly neutralizing formaldehyde solutions in which the neutralizing solution is comprised of 20 to 50 percent urea, 3 to 7 percent acid, 1 to 10 percent calcium chloride and a quantity sufficient percent water.

f) To provide a method of rapidly neutralizing formaldehyde solutions in which the neutralizing solution is applied wet to the matrix or medium and then dried by the means of heated air.

g) To provide a method of rapidly neutralizing formaldehyde solutions in which the neutralizing solution is applied to the matrix or medium by the means of freeze-drying.

h) To provide a method of rapidly neutralizing formaldehyde solutions in which the neutralizing solution is applied to the matrix or medium by the means of gas or steam.

SUMMARY

In accordance with the present invention a method of rapid formaldehyde neutralization comprises a formula of 20 to 50 percent urea, 3 to 7 percent acid, 1 to 10 percent calcium chloride and a quantity sufficient percent water, where this mixture is reacted directly with formaldehyde for neutralization or applied to a matrix or medium and dried for reaction with formaldehyde solution or vapors.

DETAILED DESCRIPTION

In the following paragraphs, the present invention will be described in detail. Throughout this description, the preferred embodiment shown should be considered as exemplars, rather than limitations on the present invention. As used herein, "the present invention" refers to any of the embodiments of the invention described herein.

The present invention alleviates to a great extent the disadvantages of known methods of neutralizing formaldehyde solutions and formaldehyde vapors by providing a rapid reaction formula that can be practically used for contact directly with formaldehyde in solution or with formaldehyde vapors that exist in the air. In general, the present invention includes a formulation of 20 to 50 percent urea, 3 to 7 percent phosphoric, citric or hydrochloric acid, 1 to 10 percent calcium chloride and a quantity sufficient percent water. The urea, acid and calcium chloride are dissolved into the water and then applied to a matrix or medium such as a cellulose fiber material. This chemically treated medium is then dried, and ready for use to absorb, react with and neutralize formaldehyde either by contact directly with the formaldehyde solution by absorbing formaldehyde vapor from the ambient air, or by absorbing formaldehyde vapor from air that is forced over or through the chemically treated medium. In the case of exposure to formaldehyde vapor to the medium from the air, the hydroscopic nature of the dried medium along with the calcium chloride pulls the formaldehyde vapor from the air, reacting with the formaldehyde molecules and rapidly neutralizing them by the action of a polymerization process quickened by the calcium chloride. In the case of direct contact with formaldehyde solutions with the chemically treated medium, the formaldehyde molecules are rapidly neutralized once again by the polymerization process hastened by the calcium chloride. In each case, this polymerization process irreversibly neutralizes the formaldehyde molecules, changing them to a polymer that is both nonhazardous and nontoxic. This facilitates a rapid method for a technician working with formaldehyde to change a hazardous formaldehyde solution or vapor to a nonhazardous material.

Alternatively, this rapid formaldehyde neutralization formula can also be employed to neutralize waste formaldehyde for nonhazardous disposal.

One aspect of the present invention is the versatility of the types of acid that can be used in the formulation.

The present invention also provides a method for neutralizing formaldehyde that includes the steps of: (1) introducing the prepared neutralizing material into the presence of formaldehyde solution or vapor; (2) allowing the prepared neutralizing material to absorb the formaldehyde solution or vapor and rapidly react with the formaldehyde, rendering it nontoxic and nonhazardous; and (3) removing the resulting nonhazardous material for proper disposal.

The present invention comprises a mixture of 20 to 50 percent urea, 3 to 7 percent acid, 1 to 10 percent calcium chloride and a quantity sufficient percent water. This mixture is applied to a matrix or medium and then dried, becoming hydroscopic. When this treated and dried matrix or medium comes into contact with formaldehyde solutions or vapor, the dried and hydroscopic mixture within the matrix or medium absorbs the formaldehyde, reacting with the formaldehyde molecules, rapidly and irreversibly changing the formaldehyde molecules to a polymerized nontoxic and nonhazardous material.

An alternative embodiment of the present invention employs the use of the aforementioned mixture of urea, acid, calcium chloride and water that would be mixed with a waste formaldehyde solution for the purpose of neutralizing and disposing of the waste formaldehyde solution.

Referring to FIG. 1, one method of operating the presenting invention is illustrated. In step 320, the formaldehyde neutralizing mixture that has been applied and dried on the medium makes contact with formaldehyde solution or vapor.

In step 325, the chemically treated, dried and hydroscopic medium absorbs the formaldehyde solution or vapor.

In step 330, the formaldehyde molecules in the solution or vapor react with the chemical mixture within the medium, and begins to rapidly polymerize the formaldehyde molecules.

In step 335, the formaldehyde molecules absorbed by the medium have been irreversibly changed to a nonhazardous and nontoxic polymer.

In step 340, the neutralized, nonhazardous material is now ready for safe disposal.

Thus, it is seen that a formulation and method for rapidly neutralizing formaldehyde solutions and vapor are provided. One skilled in the art will appreciate that the present invention can be practiced by other than the preferred embodiments which are presented in this description for the purposes of illustration and not limitation and the present invention is limited only by the claims in the non-provisional patent application. It is noted that the equivalents for the particular embodiments in this description may practice the invention as well.

What is claimed is:

1. A composition of matter for rapid neutralization of formaldehyde solution and vapor comprising:
   a mixture of urea, acid and calcium chloride, whereby said mixture will rapidly neutralize formaldehyde solutions and vapor.

2. The composition of matter of claim 1, wherein the mixture is applied to a matrix or medium and dried.

3. The composition of matter of claim 1, wherein a varied type of acid can be combined with urea and calcium chloride.

4. The composition of matter of claim 1, wherein calcium chloride is used as a formaldehyde neutralizing accelerant.

5. The composition of matter of claim 1, wherein calcium chloride is used as a hydroscopic agent.

* * * * *